US009129064B2

(12) United States Patent
Toivanen et al.

(10) Patent No.: US 9,129,064 B2
(45) Date of Patent: Sep. 8, 2015

(54) USB 3.0 LINK LAYER TIMER ADJUSTMENT TO EXTEND DISTANCE

(71) Applicant: Icron Technologies Corporation, Burnaby (CA)

(72) Inventors: Kris Steven Toivanen, Vancouver (CA); Sukhdeep Singh Hundal, Surrey (CA); Terence Carl Sosniak, Aldergrove (CA)

(73) Assignee: Icron Technologies Corporation, Burnaby (CA)

(*) Notice: Subject to any disclaimer, the term of this patent is extended or adjusted under 35 U.S.C. 154(b) by 39 days.

(21) Appl. No.: 13/843,630

(22) Filed: Mar. 15, 2013

(65) Prior Publication Data

US 2014/0122752 A1 May 1, 2014

Related U.S. Application Data

(60) Provisional application No. 61/639,044, filed on Apr. 26, 2012.

(51) Int. Cl.
*G06F 13/38* (2006.01)
*H04L 29/06* (2006.01)

(52) U.S. Cl.
CPC .............. *G06F 13/385* (2013.01); *H04L 69/22* (2013.01); *H04L 69/24* (2013.01)

(58) Field of Classification Search
CPC ........ G06F 13/385; H04L 69/22; H04L 69/24
See application file for complete search history.

(56) References Cited

U.S. PATENT DOCUMENTS

| 7,028,133 | B1 | 4/2006 | Jackson |
| 7,149,833 | B2 | 12/2006 | McLeod |
| 7,346,728 | B1 | 3/2008 | Jackson |
| 7,493,431 | B2 | 2/2009 | McLeod |
| 8,166,221 | B2 | 4/2012 | Lee |

(Continued)

FOREIGN PATENT DOCUMENTS

| EP | 1 155 370 A1 | 11/2001 |
| EP | 1 730 645 A1 | 12/2006 |

(Continued)

OTHER PUBLICATIONS

Universal Serial Bus 3.0 specification, May 1, 2011, Revision 1.0, pp. 3-1, 3-6 and 7-21.*

(Continued)

*Primary Examiner* — Idriss N Alrobaye
*Assistant Examiner* — Ronald Modo
(74) *Attorney, Agent, or Firm* — Christensen O'Connor Johnson Kindness PLLC

(57) ABSTRACT

Methods and devices for transmitting SuperSpeed information between a host device and a USB device via an extension medium are provided. Link partner relationships are established between the host device and an upstream facing port device, between the USB device and a downstream facing port device, and between the upstream facing port device and the downstream facing port device. While the link partner relationship between the upstream facing port device and the downstream facing port device is substantially compliant to the USB 3.0 Specification, the link partner relationship may use a configurable link layer acknowledgement timer to compensate for delays in transmission over the extension medium.

13 Claims, 4 Drawing Sheets

(56) References Cited

U.S. PATENT DOCUMENTS

| | | | |
|---|---|---|---|
| 2004/0177197 A1* | 9/2004 | McLeod | 710/300 |
| 2005/0033877 A1 | 2/2005 | McLeod | |
| 2007/0239900 A1 | 10/2007 | Beasley | |
| 2008/0046608 A1 | 2/2008 | Lee | |
| 2013/0191570 A1 | 7/2013 | Lee | |

FOREIGN PATENT DOCUMENTS

| | | |
|---|---|---|
| WO | 2012/075655 A1 | 6/2012 |
| WO | 2012/083423 A1 | 6/2012 |

OTHER PUBLICATIONS

International Search Report and Written Opinion mailed Aug. 5, 2013, issued in corresponding International Application No. PCT/CA2013/000413, filed Apr. 26, 2013, 9 pages.

"Universal Serial Bus 3.0 Specification (Including Errata and ECNs Through May 1, 2011)," Revision 1.0, Jun. 6, 2011, 531 pages.

* cited by examiner

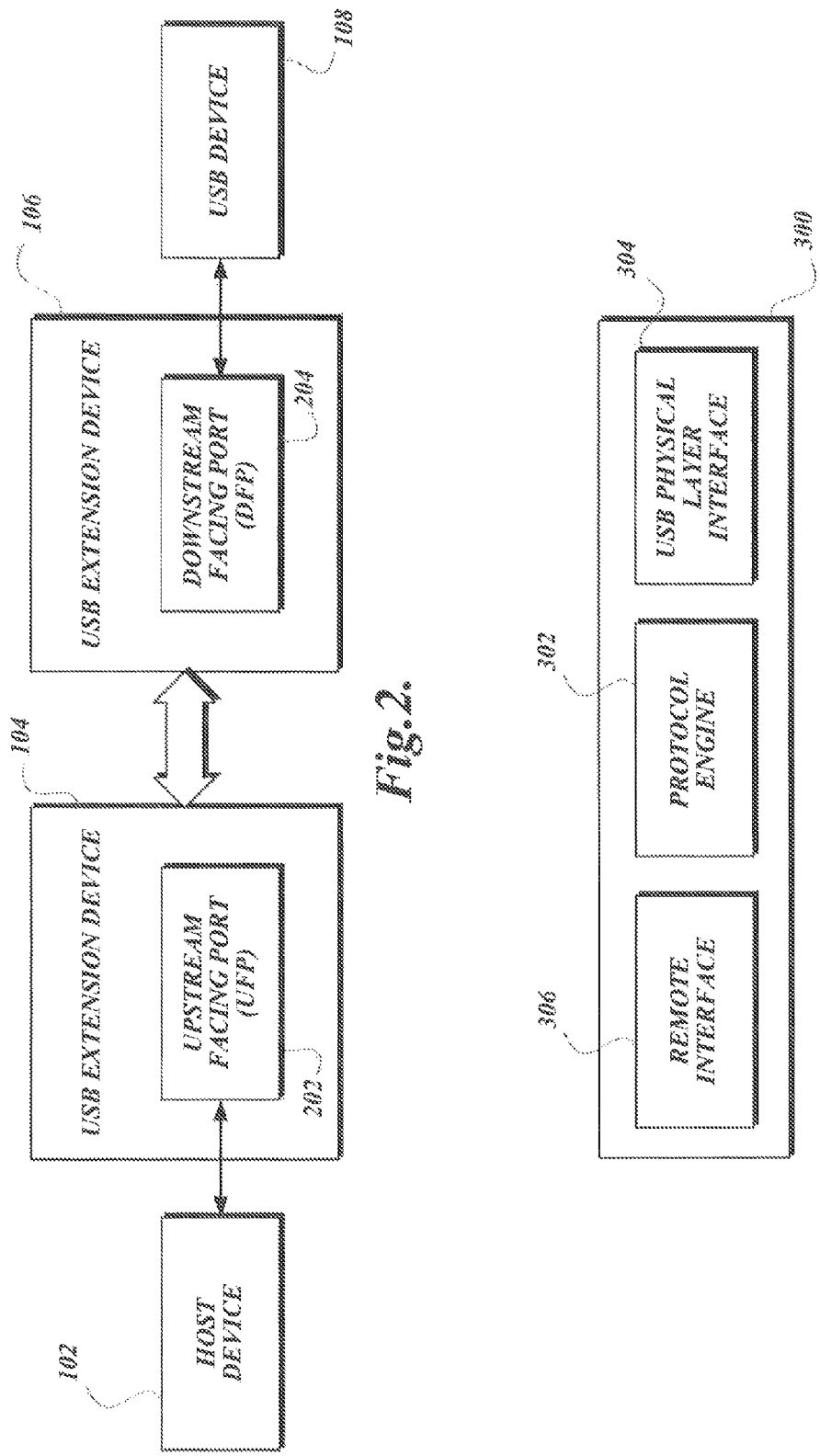

USB 3.0 LINK LAYER TIMER ADJUSTMENT TO EXTEND DISTANCE

CROSS-REFERENCE TO RELATED APPLICATION

This application claims the benefit of Provisional Application No. 61/639,044, the entire disclosure of which is incorporated by reference herein.

BACKGROUND

Universal Serial Bus (USB) is a peripheral interface for attaching a wide variety of computing devices, such as personal computers, digital telephone lines, monitors, modems, mice, printers, scanners, game controllers, keyboards, storage devices. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions) are nonproprietary and are managed by an open industry organization known as the USB Forum.

The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.0 of the USB Specifications, SuperSpeed connections are provided between devices that establish "link partner" relationships with each other. Though the specification does not mandate any particular maximum cable length, in practical terms the timing mandates and signaling techniques require a regular copper cable used for a SuperSpeed connection between a host and a device to be at most 3 meters long to properly support the SuperSpeed connection between the link partners. Therefore, a new method and apparatus are needed to optionally allow for extension of a SuperSpeed USB device to a greater distance from the host to which it is coupled, such that SuperSpeed USB packets may be propagated between the host device and the USB device.

However, existing methods and systems have some limitations. Use of these methods and systems may still result in unstable system behavior under some conditions. For example, at extension lengths greater than 50 meters the system ports may become unstable and cycle in and out of the Recovery state. System instability has also been observed during periods of high traffic, when using multiple devices, and when using non-traditional media. Therefore, a new method and apparatus are needed to optionally allow for extension of a SuperSpeed USB device from the host to which it is coupled, such that the system may consistently remain in a state where it may propagate SuperSpeed USB packets.

It may be desirable to provide a connection between a host device and a USB device using a non-traditional medium that is not USB 3.0 compliant, such as an optical or electrical medium. If a medium is used that is not USB 3.0 compliant, the USB 3.0 compliant hubs may malfunction and result in overall unstable system behavior. Therefore, a new method and apparatus are needed to optionally allow for extension of a SuperSpeed USB device from the host to which it is coupled, such that SuperSpeed USB packets may be propagated through a non-USB compliant medium between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a USB extension device is provided. The USB extension device comprises a USB physical layer interface, a remote interface, and a protocol engine. The protocol engine is configured to establish a first link partner relationship with a device via the USB physical layer interface; establish a second link partner relationship with a second USB extension device via the remote interface; transmit a header packet received from the device via the USB physical layer interface to the second USB extension device via an extension medium accessible via the remote interface; and receive a header packet acknowledgement from the second USB extension device; wherein the header packet acknowledgement is received at an elapsed time after the header packet transmission that is greater than a standard link layer acknowledgement timer without causing the second link partner relationship or the first link partner relationship to transition to recovery.

In some embodiments, a method of providing SuperSpeed communication between a host device and a USB device over an extension medium is provided. A first link partner relationship is established between an upstream facing port device (UFP device) and the host device. A second link partner relationship is established between a downstream facing port device (DFP device) and the USB device. A third link partner relationship is established between the UFP device and the DFP device. A value of a standard link layer acknowledgement timer of the first link partner relationship and of the second link partner relationship is three microseconds, and a value of a configurable link layer acknowledgement timer of the third link partner relationship is configurable to be greater than three microseconds.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a block diagram that illustrates further details of the upstream USB extension device and downstream USB extension device illustrated in FIG. 1;

FIG. 3 is a block diagram that illustrates an exemplary embodiment of a port device according to various aspects of the present disclosure;

DETAILED DESCRIPTION

Figure 1:
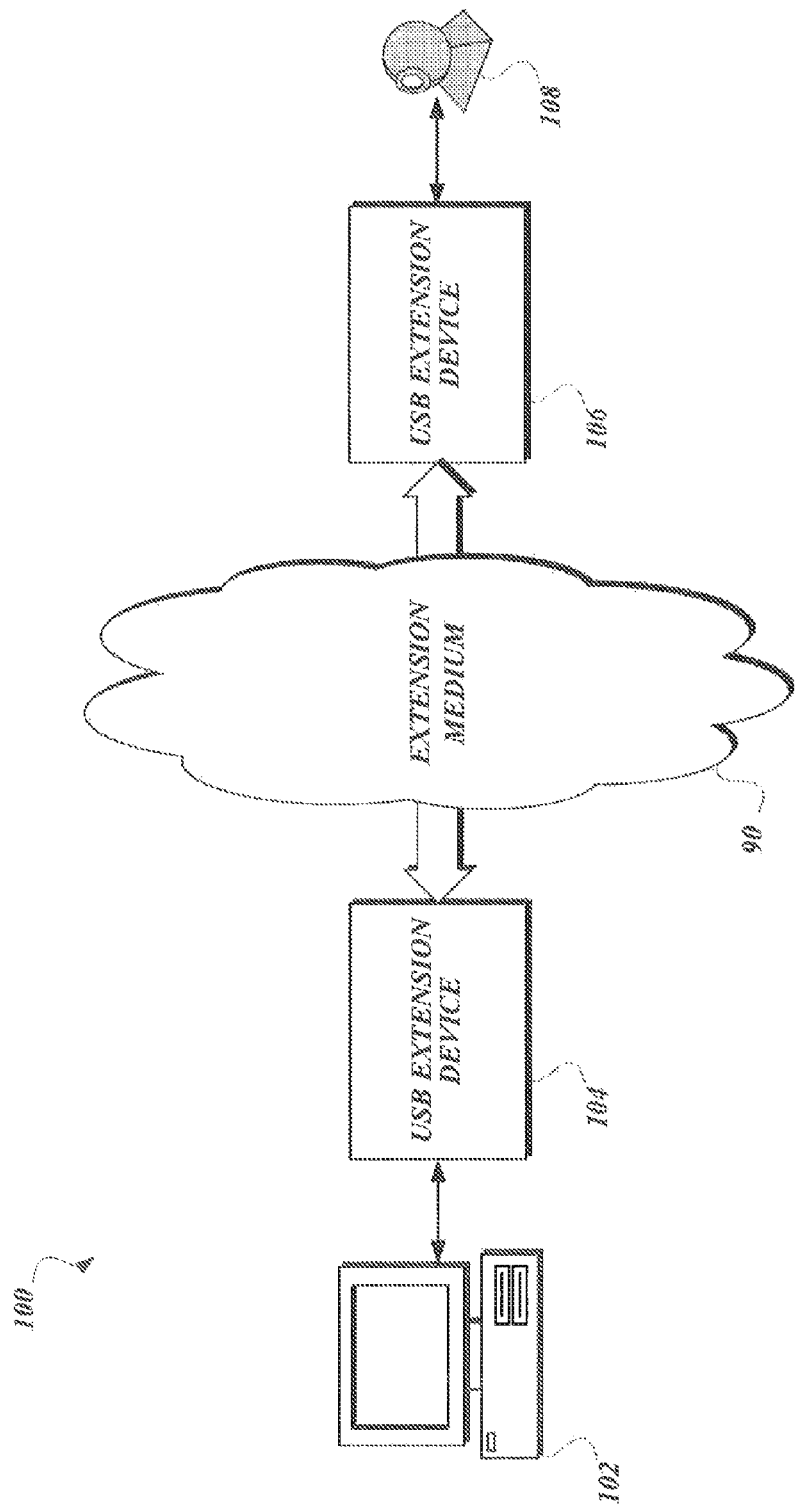
FIG. 1 is a block diagram that illustrates an exemplary embodiment of a system for extending USB communication according to various aspects of the present disclosure.

FIG. 1 is a block diagram that illustrates an exemplary embodiment of a system 100 for extending USB communication according to various aspects of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, or USB 3.0. For SuperSpeed communication, the host device 102 and the USB device 108 would typically be connected to each other at the link layer as link partners. As discussed above, once the host device 102 and USB device 108 are separated by a non-USB communication medium issues may arise with regard to the host device 102 and/or the USB device 108.

The host device 102 may be any type of computing device containing a USB host controller or a downstream facing port. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller or otherwise having an upstream facing port. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via a extension medium 90 that may increase the distance between the host 102 and the USB device 108 beyond that supported by the USB specification. The extension medium 90 and communication thereon may include any suitable networking technology, such as Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the upstream USB extension device 104 and the downstream USB extension device 106 may happen to be closer to each other than the short USB requirement distance, but may nevertheless communicate via the extension medium 90.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, the upstream USB extension device 104 is interchangeably described as an upstream facing port device or UFP device, and the downstream USB extension device 106 is interchangeably described as a downstream facing port device or DFP device. The UFP 202 is configured at least to communicate with the host device 102 via a USB-standard-compliant protocol, and to exchange USB bus traffic and other signals with the DFP 204. The DFP 204 is configured at least to communicate with the device 108 via a USB-standard-compliant protocol, and to exchange messages and USB bus traffic with the UFP 202. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of a host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of the simple topology illustrated in FIG. 2, but one of ordinary skill in the art will recognize that in some embodiments similar techniques may be used in other topologies without departing from the scope of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP 202 and/or the DFP 204. The protocol engine 302 may instruct the USB physical layer interface 304 to apply the appropriate electrical signals to the USB physical layer in order to communicate with the USB device 108 or the host 102. Likewise, the protocol engine 302 may instruct the remote interface 306 to exchange information with the remote USB extension device.

In some embodiments, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP 202 or the DFP 204 as if it was a single device for ease of discussion. One of ordinary skill in the art will recognize that actions attributed directly to the UFP 202 or the DFP 204 may actually be performed by a protocol engine 302, a USB physical layer interface 304, a remote interface 306, and/or some other component of the USB extension device.

In some embodiments, the UFP 202 and DFP 204 may be configured to operate in one of a plurality of modes, depending on the latency of the link between them. In a low latency mode, the UFP 202 and DFP 204 may be linked by a communication channel of adequate speed to support a SuperSpeed USB 3.0 connection simply by bridging USB packets across the communication channel. In a medium latency mode, the UFP 202 and DFP 204 may use a first technique to compensate for the delay in packet transmission between the UFP 202 and the DFP 204, and in a high latency mode, the UFP 202 and the DFP 204 may use a second technique to compensate for the delay in packet transmission.

In some embodiments, the mode may be selected by a user while configuring the UFP 202 and the DFP 204. In some embodiments, the UFP 202 and DFP 204 may automatically determine a degree of latency between the devices and may automatically choose a mode based on that determination.

In some embodiments, SuperSpeed communication between the host device 102 and the USB device 108 via the UFP device 104 and the DFP device 106 may be supported at the link layer of the USB 3.0 protocol stack by establishing one or more modified link partnerships to replace standard link partnerships that would otherwise be created in a standard SuperSpeed connection between the host device 102 and the USB device 108. For example, a link partnership may be established between the host device 102 and the UFP device 104, and a link partnership may be established between the DFP device 106 and the USB device 108. Further, even though the UFP device 104 and the DFP device 106 may communicate with each other at a physical level and/or protocol level using non-standard techniques, a link partnership may be established between the UFP device 104 and the DFP device 106 at the link layer (point-to-point) that is substantially similar to the link partnership described in the Universal Serial Bus 3.0 Specification, Revision 1.0 (including errata and ECNs through May 1, 2011), issued Jun. 6, 2011, and hereby incorporated herein by reference in its entirety for all purposes (hereinafter "USB 3.0 Specification").

Link layer related issues that arise in supporting a link partnership between the host device 102 and the USB device 108 across a non-USB 3.0 extension medium may be addressed using a modified link partner management technique. The protocol engine 302 of the UFP device 104 and the DFP device 106 may include a link partner management engine. The link partner management engine allows link management packets to be passed from the host device 102 to the USB device 108 via the extension medium 90.

A link partner management engine may be present on one or both ends of the extension medium 90. The link partner management engine of a first device generates a command in response to receiving a link management packet. The command is transmitted over the extension medium 90 and is received by a second device. The second device converts the command into a link management packet corresponding to the link management packet transmitted by the first device. The link partner management engine generates a link management packet after receiving the command corresponding to receiving a link management packet.

Figure 4:
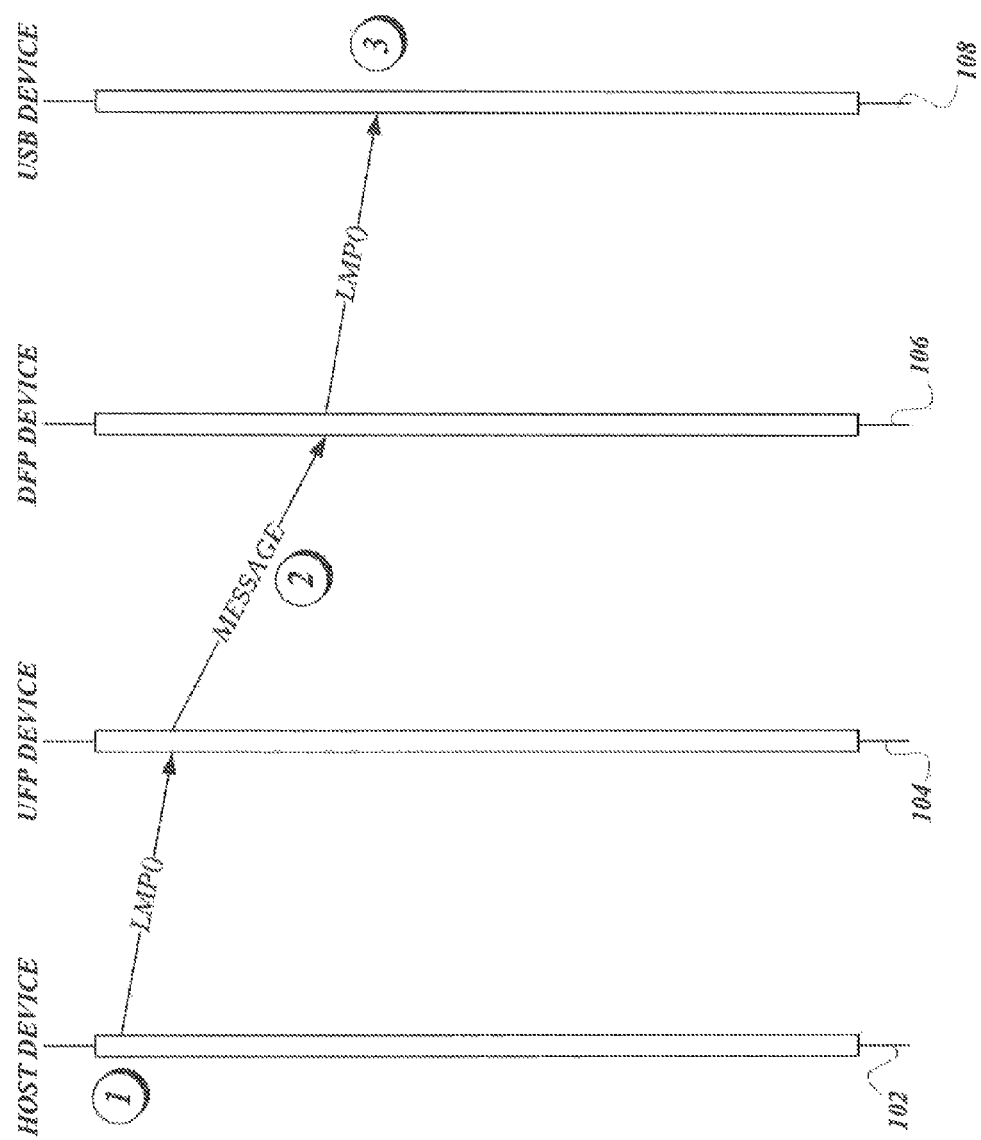
FIG. 4 is a sequence diagram that illustrates exemplary communication between a host device and a USB device using an upstream facing port device and a downstream facing port device connected by a non-USB 3.0 compliant communication channel, according to various aspects of the present disclosure.

FIG. 4 is a sequence diagram that illustrates exemplary communication between a host device 102 and a USB device 108 using an upstream facing port device (UFP device) and a downstream facing port device (DFP device) connected by a non-USB 3.0 compliant communication channel, according to various aspects of the present disclosure.

At point 1 the host transmits a link management packet to the UFP device. At point 2, the UFP device converts/generates the link management packet into a command/message to be transmitted over the non-USB 3.0 compliant medium. The DFP device receives the message, and in response to the received command, the DFP device generates a link management packet based on the received command/message from the UFP device. At point 3, the DFP device transmits the generated link management packet to the USB device 108.

The link partner management engines of the UFP device 104 and the DFP device 106 may be configured to establish standard link partnerships between the UFP device 104 and the host device 102, and between the DFP device 106 and the USB device 108, respectively, and to manage traffic between each other over the extension medium 90. Some examples of similar management of USB communication between a UFP device and a DFP device are described in commonly owned, co-pending U.S. patent application Ser. No. 13/683,993, filed Nov. 21, 2012, the entire disclosure of which is incorporated herein by reference for all purposes.

As stated above, the connection between the UFP device 104 and the DFP device 106 may include a link partnership that substantially complies with the link layer (point-to-point) aspects of the USB 3.0 Specification. The USB 3.0 Specification includes transmitter timers, including transmitter timers in the link layer (point-to-point). A PENDING_HP_TIMER is specified in Section 7.2.4.1.10 for covering the period of time from when a header packet is sent to a link partner, to when the header packet is acknowledged by a link partner, and is described as causing the system to enter the Recovery state if the timer goes over 3 microseconds. If the transmitting link partner does not receive a packet from the receiving link partner acknowledging a transmitted header packet within 3 microseconds, it will cause the system to enter the Recovery state, which may lead to unstable system behavior and drastically reduced rates of data transfer. In embodiments of the present disclosure where a substantially standard link partnership is established between the UFP device 104 and the DFP device 106, such issues may arise frequently, as a high level of data traffic between link partners, a type of transmission media, any conversions of the data into another medium, or the physical distance between link partners could cause a link layer timer such as the standard PENDING_HP_TIMER to timeout and cause the system to enter the Recovery state.

System instability caused by the timing out of the PENDING_HP_TIMER in an otherwise standard link partnership between the UFP device 104 and the DFP device 106 may be eliminated by configuring the UFP device 104 and the DFP device 106 to establish a link partnership that substantially complies with the USB 3.0 Specification but for a PENDING_HP_TIMER with a timeout set at greater than 3.0 microseconds. In some embodiments, the PENDING_HP_TIMER used by the UFP device 104 and/or the DFP device 106 may be configurable to any desired value. In some embodiments, the PENDING_HP_TIMER may be disabled altogether. In some embodiments, other related timers, such as a CREDIT_HP_TIMER, may also be configurable.

Figure 5:
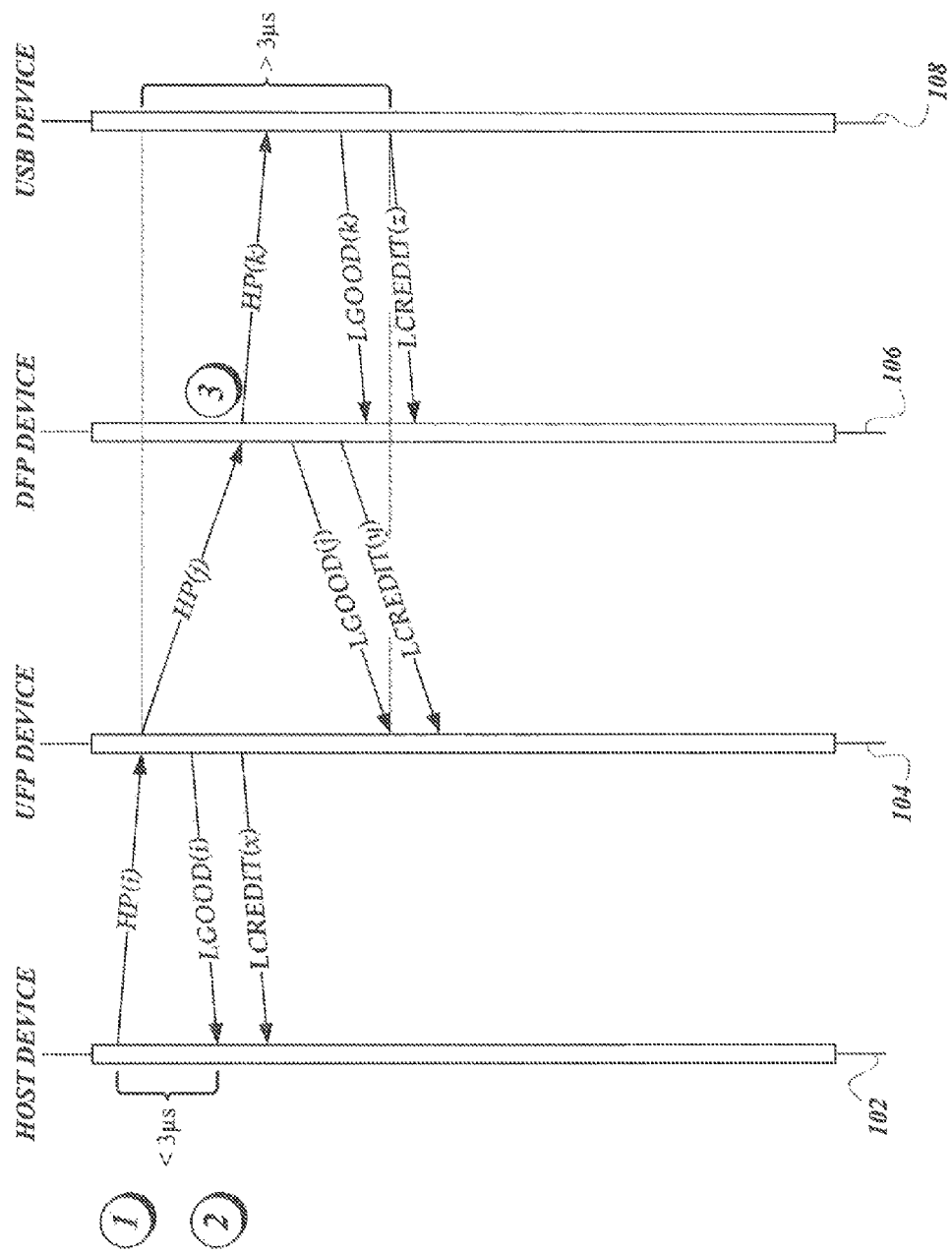
FIG. 5 is a sequence diagram that illustrates exemplary link header packet communication and acknowledgement between a host device and a USB device using a UFP device and a DFP device, according to various aspects of the present disclosure.

FIG. 5 is a sequence diagram that illustrates exemplary link header packet communication and acknowledgement between a host device 102 and a USB device 108 using an UFP device 104 and a DFP device 106, according to various aspects of the present disclosure. In the illustrated sequence diagram, standard link partnerships are established between the host device 102 and the UFP device 104, and between the DFP device 106 and the USB device 108. A substantially standard link partnership is established between the UFP device 104 and the DFP device 106, but for a configurable PENDING_HP_TIMER. At point 1, the host device 102 transmits a header packet to the UFP device 104. At point 2, the UFP device 104 generates a header packet acknowledgement. The header packet acknowledgement may include a link command word such as an LGOOD or LBAD. As illustrated, an LGOOD is generated and transmitted to the host device 102. It should be understood that other types of header packet acknowledgements may be generated and transmitted to the host device 102. The specific header packet acknowledgement may be based on the header packet received from the host device 102 and whether it is determined to be as expected and checked for errors or not.

In addition to transmitting a header packet acknowledgment, the UPF device 104 may transmit a link command indicating a level of buffer credits available, such as an LCRD_x command. The header packet acknowledgment and the buffer credit may be generated and communicated to the host device 102 before the UFP device 104 receives any acknowledgment related to the related information that it sends to the DPF device 106. One of ordinary skill in the art will recognize that the communication between the host device 102 and the UFP device 104 is similar to standard communication between USB 3.0 link partners, and the timing between the header packet transmission and header packet acknowledgement is less than the standard PENDING_HP_TIMER time of 3.0 microseconds.

Once the UFP device 104 receives the header packet, the UFP device 104 transmits the received header packet to the DFP device 106 via the extension medium 90. As described above, even though the UFP device 104 and the DFP device 106 otherwise communicate at the link layer level substantially as USB 3.0-compliant link partners, in some embodiments the header packet is converted into command or a message that may be transmitted over a non-USB compliant medium. For example, the signal could be converted into the digital domain and transmitted over fiber optic cable, coaxial cable, and/or any other suitable extension medium 90.

At point 3, the DFP device 106 receives the header packet from the UFP device 104. Similar to the discussion above in relation to the communication between the UFP device 104 and host device 102 link partners, the DFP device 106 generates and transmits a header packet acknowledgement and buffer credit information to the UFP device 104. Though the UFP device 104 and DFP device 106 have otherwise been communicating at the link layer level substantially as USB 3.0-compliant link partners, the UFP device 104 has been configured to wait longer than the standard PENDING_HP_TIMER time, e.g., longer than 3 microseconds, for the header packet acknowledgement, without entering a recovery state. A link partner connection between the UFP device 104 and the DFP device 106 may therefore be maintained despite a transmission or processing delay related to traffic over the extension medium 90.

In some embodiments, the header packet acknowledgment and buffer credit information may be sent by the DFP device 106 before any buffer credit information or acknowledgment is received from the USB device 108, in order to minimize the additional delay. At point 3, the header packet is transmitted by the DFP device 106 to the USB device 108. Based on the received header packet, the USB device 108 transmits a header packet acknowledgment and buffer credit information to the DFP device 106.

One of ordinary skill in the art will recognize that, although transmission of a header packet from a host device 102 to a USB device 108 is illustrated and described, embodiments of the present disclosure may also support transmission of other types of link layer information from the USB device 108 to the host device 102 in a similar way. Further, while the configurable PENDING_HP_TIMER has been used in the above examples to provide for a greater delay in transmission than would comply with the USB 3.0 Specification, in some embodiments, the allowable distance between the host device 102 and the USB device 108 may be limited to less than that allowed by the USB 3.0 Specification by decreasing the timeout setting of the PENDING_HP_TIMER. This may be useful to provide added security or other features relating to limiting the distance between the UFP device 104 and the DFP device 106.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A Universal Serial Bus (USB) extension device, comprising:
 a USB physical layer interface;
 a remote interface; and
 a protocol engine configured to:
   establish a first link partner relationship with a device via the USB physical layer interface;
   establish a second link partner relationship with a second USB extension device via the remote interface;
   transmit a header packet received from the device via the USB physical layer interface to the second USB extension device via an extension medium accessible via the remote interface;
   receive a header packet acknowledgement from the second USB extension device;
   monitor the elapsed time between transmission of the header packet and receipt of the header packet acknowledgement using a configurable timer; and
   cause the second link partner relationship to transition to recovery in response to determining that the header packet acknowledgement has not been received within an elapsed time after the header packet transmission indicated by the configurable timer;
 wherein the header packet acknowledgement is received at an elapsed time after the header packet transmission that is greater than a standard link layer acknowledgement timer without causing the second link partner relationship or the first link partner relationship to transition to recovery; and
 wherein the configurable timer is set to a value greater than three microseconds.

2. The device of claim 1, wherein the configurable timer replaces a PENDING_HP_TIMER.

3. The device of claim 1, wherein the extension medium includes fiber optic cable or coaxial cable.

4. The device of claim 1, wherein the USB physical layer interface includes an upstream facing port or a downstream facing port.

5. A method of providing SuperSpeed communication between a host device and a Universal Serial Bus (USB) device over an extension medium, the method comprising:
   establishing a first link partner relationship between an upstream facing port device (UFP device) and the host device;
   establishing a second link partner relationship between a downstream facing port device (DFP device) and the USB device;
   establishing a third link partner relationship between the UFP device and the DFP device;
   receiving, by the UFP device from the host device, a header packet;
   transmitting, by the UFP device to the DFP device, a message that includes the header packet at a first time;
   transmitting, by the DFP device to the USB device, the header packet;
   transmitting, by the DFP device to the UFP device, a message that includes a header packet acknowledgement before receiving a header packet acknowledgement from the USB device;
   receiving, by the UFP device from the DFP device, the message that includes the header packet acknowledgement at a second time;
   comparing, by the UFP device an elapsed time between the first time and the second time to the value of the configurable link layer acknowledgement timer;
   wherein a value of a standard link layer acknowledgement timer of the first link partner relationship and of the second link partner relationship is three microseconds; and
   wherein a value of a configurable link layer acknowledgement timer of the third link partner relationship is configurable to be greater than three microseconds.

6. The method of claim 5, further comprising:
   placing the third link partner relationship in recovery in response to determining that the elapsed time is greater than the value of the configurable link layer acknowledgement timer.

7. The method of claim 5, wherein the standard link layer acknowledgement timer is a PENDING_HP_TIMER.

8. The method of claim 5, wherein the extension medium includes fiber optic cable or coaxial cable.

9. A Universal Serial Bus (USB) extension device, comprising:
   a USB physical layer interface;
   a remote interface; and
   a protocol engine configured to:
      establish a first link with a device via the USB physical layer interface;
      establish a second link with a second USB extension device via the remote interface;
      transmit a header packet received from the device via the USB physical layer interface to the second USB extension device via an extension medium accessible via the remote interface;
      receive a header packet acknowledgement from the second USB extension device; and
      monitor the elapsed time between transmission of the header packet and receipt of the header packet acknowledgement using a configurable timer that replaces a PENDING_HP_TIMER;
   wherein the header packet acknowledgement is received at an elapsed time after the header packet transmission that is greater than a standard link layer acknowledgement timer without causing the first link or the second link to transition to recovery.

10. The device of claim 9, wherein the protocol engine is further configured to cause the second link to transition to recovery in response to determining that the header packet acknowledgement has not been received within an elapsed time after the header packet transmission indicated by the configurable timer.

11. The device of claim 10, wherein the configurable timer is set to a value greater than three microseconds.

12. The device of claim 9, wherein the extension medium includes fiber optic cable or coaxial cable.

13. The device of claim 9, wherein the USB physical layer interface includes an upstream facing port or a downstream facing port.

* * * * *